(12) United States Patent
Lu

(10) Patent No.: US 10,823,215 B2
(45) Date of Patent: Nov. 3, 2020

(54) CONNECTING ASSEMBLY FOR CONNECTING BOARDS

(71) Applicant: Dong Guan Song Wei Electric Technology Co., Ltd., Dongguan, Guangdong (CN)

(72) Inventor: Min-Hsun Lu, Dongguan (CN)

(73) Assignee: DONG GUAN SONG WEI ELECTRIC TECHNOLOGY CO., LTD., Dongguan, Guangdong (CN)

( * ) Notice: Subject to any disclaimer, the term of this patent is extended or adjusted under 35 U.S.C. 154(b) by 331 days.

(21) Appl. No.: 15/869,077

(22) Filed: Jan. 12, 2018

(65) Prior Publication Data

US 2019/0219085 A1    Jul. 18, 2019

(51) Int. Cl.
| | | |
|---|---|---|
| *F16B 21/00* | (2006.01) | |
| *F16B 13/06* | (2006.01) | |
| *F16B 1/02* | (2006.01) | |
| *F16B 17/00* | (2006.01) | |
| *F16B 12/26* | (2006.01) | |
| *F16B 12/24* | (2006.01) | |
| *F16B 21/07* | (2006.01) | |
| *F16B 5/06* | (2006.01) | |

(52) U.S. Cl.
CPC .............. *F16B 13/061* (2013.01); *F16B 1/02* (2013.01); *F16B 5/0614* (2013.01); *F16B 12/24* (2013.01); *F16B 12/26* (2013.01); *F16B 17/004* (2013.01); *F16B 21/07* (2013.01)

(58) Field of Classification Search
CPC .... F16B 5/0044; F16B 21/07; F16B 12/2036; F16B 2012/145; F16B 13/04; F16B 13/061

USPC ........ 411/512, 347, 360, 529, 528; 403/231, 403/388, 397, 398, 252, 263
See application file for complete search history.

(56) References Cited

U.S. PATENT DOCUMENTS

| | | | | |
|---|---|---|---|---|
| 2,667,675 | A * | 2/1954 | Brutti .................... | A44C 7/003 24/707.4 |
| 4,160,610 | A * | 7/1979 | Austin-Brown .... | F16B 12/2027 403/231 |
| 4,202,645 | A * | 5/1980 | Giovannetti ........ | F16B 12/2009 403/231 |
| 4,236,848 | A * | 12/1980 | Rock ................... | F16B 12/2063 403/231 |
| 4,487,522 | A * | 12/1984 | Appleby ............. | F16B 12/2063 403/231 |
| 4,728,215 | A * | 3/1988 | Martincic ........... | F16B 12/2036 403/231 |
| 4,826,345 | A * | 5/1989 | Salice ................. | F16B 12/26 403/231 |
| 4,952,107 | A * | 8/1990 | Dupree ............... | F16B 5/0208 411/103 |

(Continued)

*Primary Examiner* — Gary W Estremsky
(74) *Attorney, Agent, or Firm* — Leong C. Lei

(57) ABSTRACT

A connecting assembly for connecting boards includes a rod member and a buckle member. The rod member includes a head portion, a rod body and a tip portion which are integrally formed and connected in sequence. By using an engaging hole to engage with an annular engaging groove, the connection of the boards is more firm due to a circumferential joint. Besides, the buckle member is provided with a cross-shaped groove, which makes it easier for the user to adjust the direction when in use. The structure design is reasonable and more convenient for use.

3 Claims, 6 Drawing Sheets

(56) References Cited

U.S. PATENT DOCUMENTS

| | | | | |
|---|---|---|---|---|
| 5,462,395 A * | 10/1995 | Damm | ............... | F16B 41/002 |
| | | | | 411/107 |
| 5,502,878 A * | 4/1996 | Anscher | ............... | F16B 21/071 |
| | | | | 24/265 H |
| 5,590,975 A * | 1/1997 | Horntvedt | ........... | F16B 12/2036 |
| | | | | 312/348.2 |
| 5,667,327 A * | 9/1997 | Salice | ............... | F16B 12/2009 |
| | | | | 403/231 |
| 5,807,013 A * | 9/1998 | Brustle | ............... | F16B 12/2009 |
| | | | | 403/231 |
| 5,807,052 A * | 9/1998 | Van Boven | ............... | F02F 1/24 |
| | | | | 411/156 |
| 6,257,796 B1 * | 7/2001 | Salice | ............... | F16B 12/2009 |
| | | | | 403/231 |
| 8,162,559 B2 * | 4/2012 | Krige | ............... | A47B 47/0025 |
| | | | | 403/259 |
| 8,221,043 B2 * | 7/2012 | Guyton | ............... | F16B 1/0014 |
| | | | | 411/511 |
| 8,585,337 B1 * | 11/2013 | Dang | ............... | H01R 13/74 |
| | | | | 411/347 |

* cited by examiner

CONNECTING ASSEMBLY FOR CONNECTING BOARDS

BACKGROUND OF THE INVENTION

1. Field of the Invention

The present invention relates to a board connector, and more particularly to a connecting assembly for connecting boards.

2. Description of the Prior Art

The connection between boards usually uses screws. However, the installation of screws requires the use of an electric or manual screwdriver, which is inconvenient for use. For this reason, there is a connecting assembly on the market. The connecting assembly mainly includes a rod member and a buckle member. The rod member is mated with the buckle member for connecting boards. However, due to the unreasonable structure design of this connecting assembly, it is also inconvenient for use.

SUMMARY OF THE INVENTION

In view of the shortcomings of the prior art, the primary object of the present invention is to provide a connecting assembly for connecting boards, which can effectively solve the problem that the existing connecting assembly is used inconveniently.

In order to achieve the aforesaid object, the connecting assembly of the present invention comprises a rod member and a buckle member. The rod member includes a head portion, a rod body and a tip portion which are integrally formed and connected in sequence. The head portion has an outer diameter greater than that of the rod body. The rod body is formed with an annular engaging groove. The annular engaging groove is disposed close to the tip portion. The buckle member is formed with an engaging hole penetrating through a circumferential side of the buckle member. The engaging hole has an inner diameter less than the outer diameter of the rod body. The tip portion passes through the engaging hole. The engaging hole is engaged with the annular engaging groove. An inner end surface of the buckle member is formed with a through slot for the buckle member to be elastically deformed. The through slot communicates with the engaging hole. An outer end surface of the buckle member is formed with a cross-shaped groove.

Preferably, the tip portion of the rod body has a cross-shaped structure.

Preferably, two ends of the annular engaging groove are formed with curved surfaces, respectively. Two ends of the engaging hole are formed with curved stepped surfaces, respectively. The curved stepped surfaces are mated with the corresponding curved surfaces.

Preferably, the cross-shaped groove is provided with an indicating arrow.

Compared with the prior art, the present invention has obvious advantages and beneficial effects. Specifically, it can be seen from the above technical solution:

By using the engaging hole to engage with the annular engaging groove, the connection of the boards is more firm because the present invention adopts a circumferential joint. Besides, the buckle member is provided with the cross-shaped groove, which makes it easier for the user to adjust the direction when in use. The structure design is reasonable and more convenient for use.

DETAILED DESCRIPTION OF THE PREFERRED EMBODIMENTS

Figure 1:
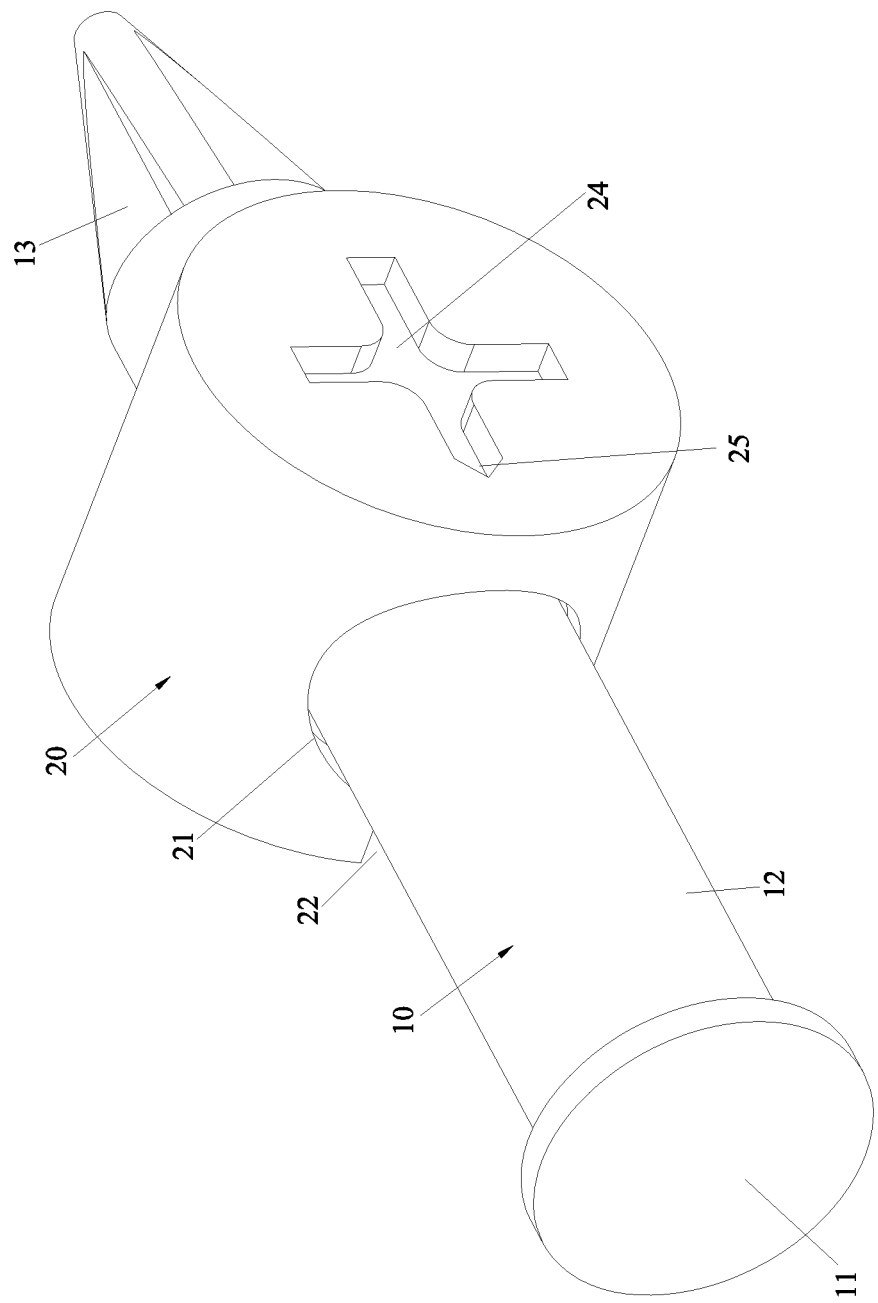
FIG. 1 is an assembled perspective view according to a preferred embodiment of the present invention.
Figure 2:
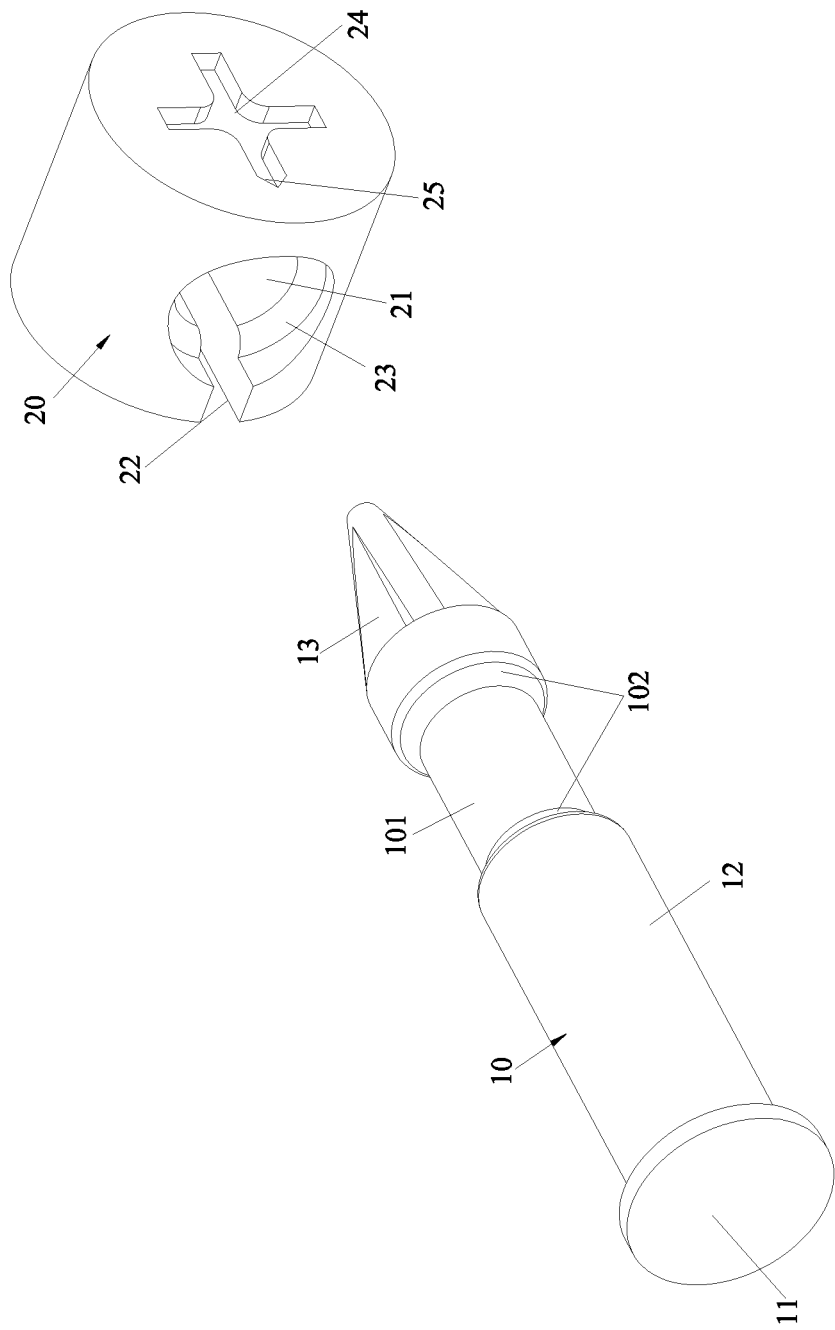
FIG. 2 is an exploded view according to the preferred embodiment of the present invention.
Figure 3:
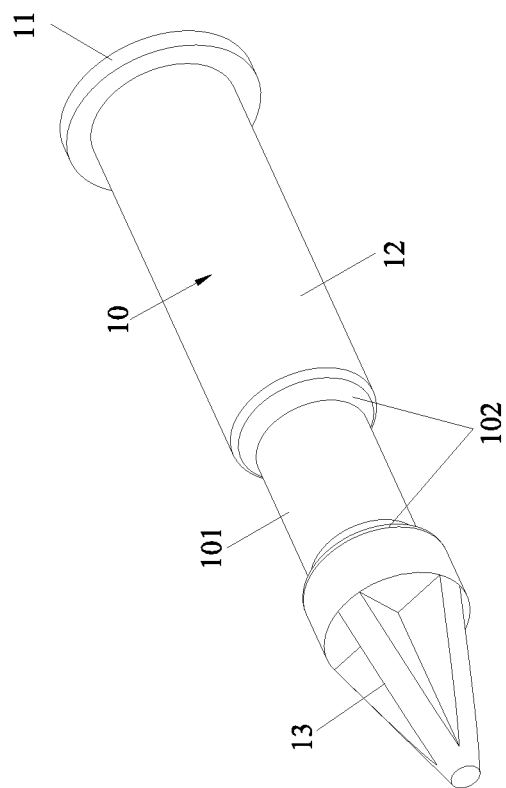
FIG. 3 is another exploded view according to the preferred embodiment of the present invention.
Figure 3:
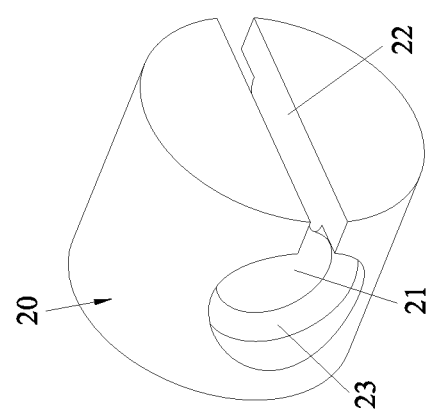

Embodiments of the present invention will now be described, by way of example only, with reference to the accompanying drawings.

As shown in FIG. 1 to FIG. 6, a preferred embodiment of the present invention comprises a rod member 10 and a buckle member 20.

The rod member 10 includes a head portion 11, a rod body 12 and a tip portion 13 which are integrally formed and connected in sequence. The outer diameter of the head portion 11 is greater than the outer diameter of the rod body 12. The rod body 12 is formed with an annular engaging groove 101. The annular engaging groove 101 is disposed close to the tip portion 13. In this embodiment, the tip portion 13 of the rod body 12 has a cross-shaped structure, which can save 15% of the material consumption and lower the manufacturing cost.

The buckle member 20 is formed with an engaging hole 21 penetrating through a circumferential side of the buckle member 20. The inner diameter of the engaging hole 21 is less than the outer diameter of the rod body 12. The tip portion 13 passes through the engaging hole 21. The engaging hole 21 is engaged with the annular engaging groove 101. An inner end surface of the buckle member 20 is formed with a through slot 22 for the buckle member 20 to be elastically deformed. The through slot 22 communicates with the engaging hole 21. In this embodiment, two ends of the annular engaging groove 101 are formed with curved surfaces 102, respectively. Two ends of the engaging hole 21 are formed with curved stepped surfaces 23, respectively. The curved stepped surfaces 23 are mated with the corresponding curved surfaces 102, such that the rod member 10 can be easily inserted in the buckle member 20, and the connection is also more firm, and the installation is more reliable. An outer end surface of the buckle member 20 is formed with a cross-shaped groove 24 which makes it easier for the user to adjust the direction conveniently. The cross-shaped groove 24 is provided with an indicating arrow 25, which makes it easier for the user to identify the installation direction to facilitate installation.

Figure 4:
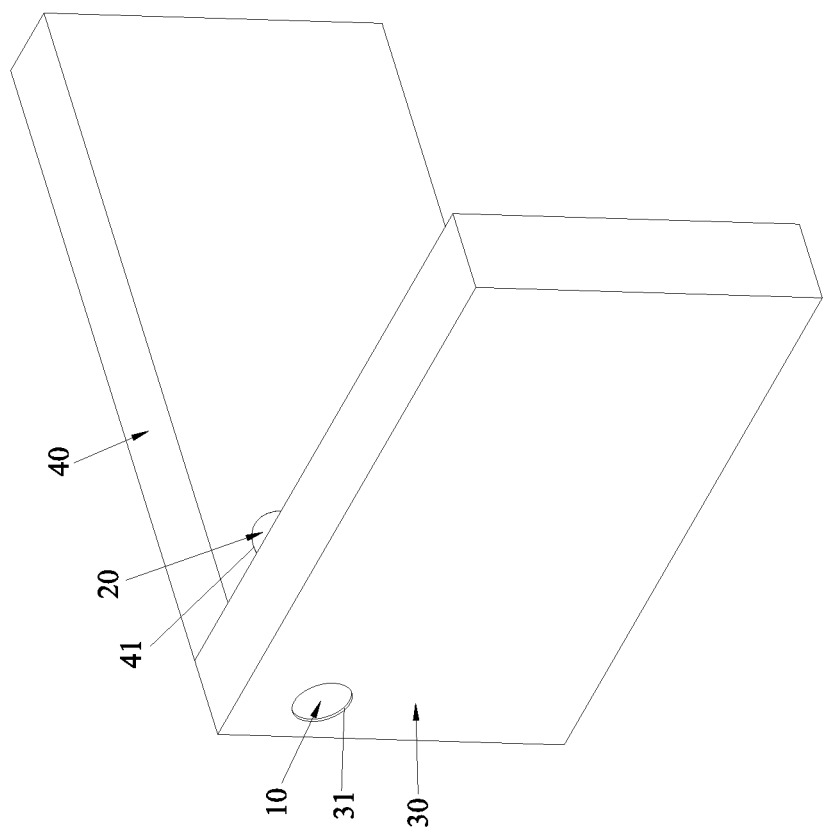
FIG. 4 is a perspective view according to the preferred embodiment of the present invention when in use.
Figure 5:
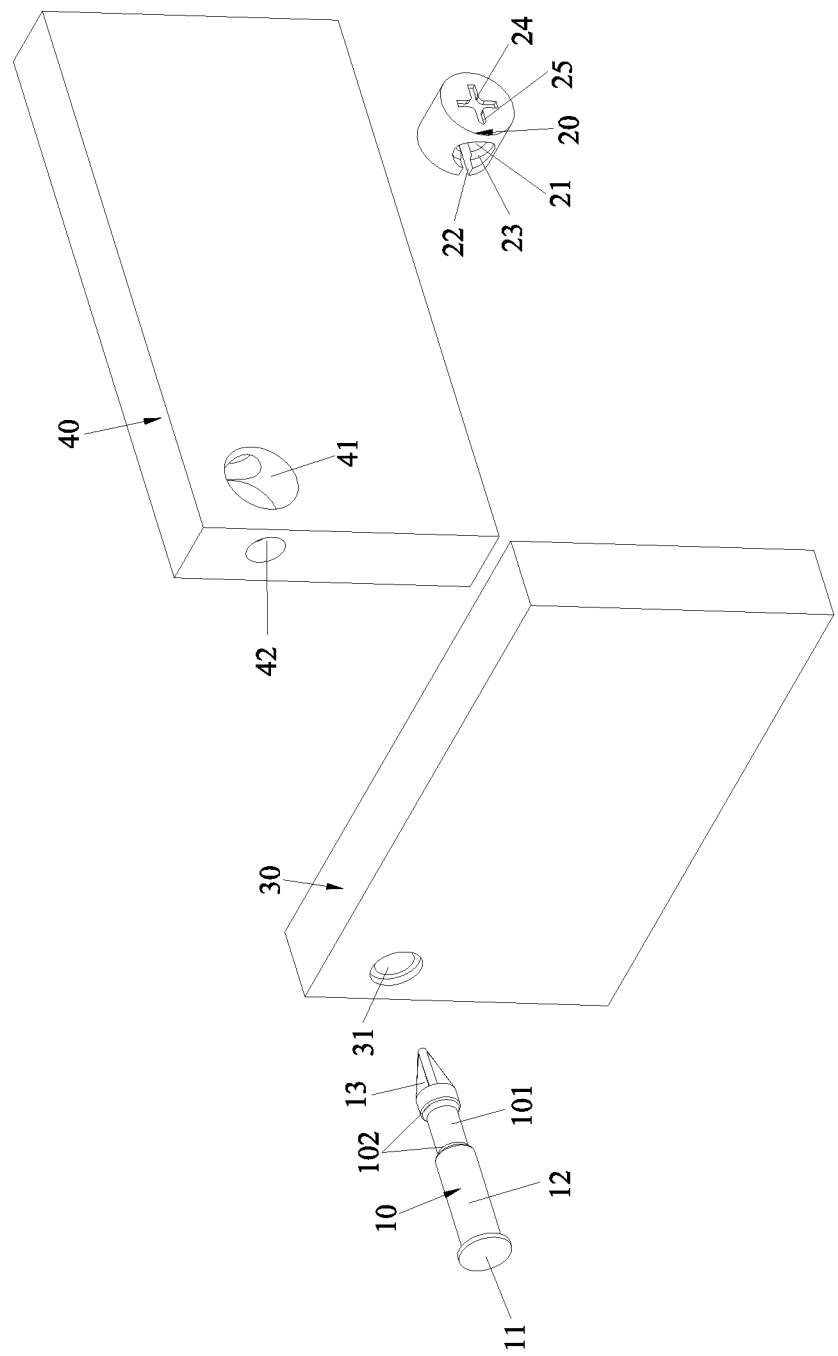
FIG. 5 is an exploded view according to the preferred embodiment of the present invention when in use.
Figure 6:
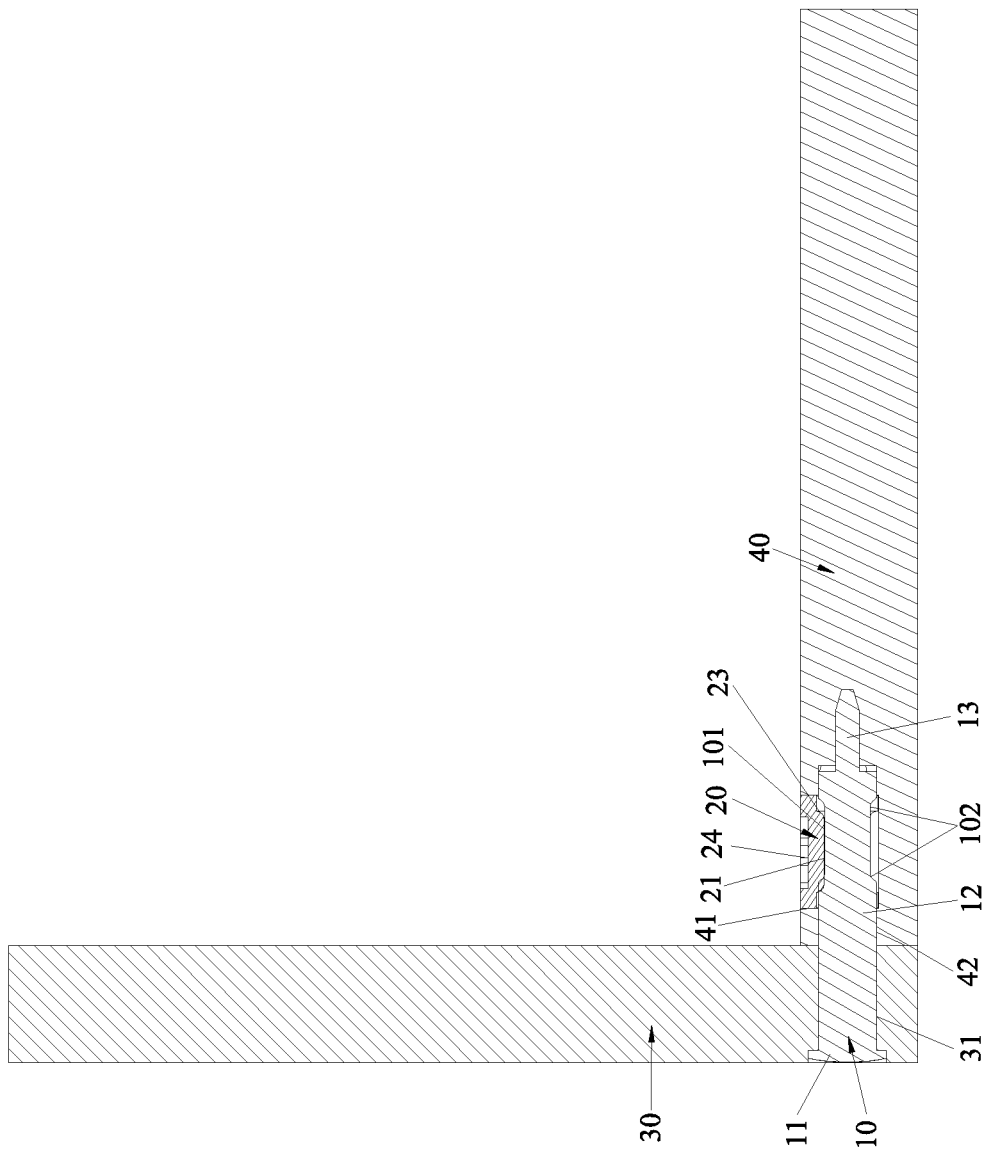
FIG. 6 is a sectional view according to the preferred embodiment of the present invention when in use.

The detailed description of the use of this embodiment is as follows:

As shown in FIG. 4 to FIG. 6, a first board 30 is formed with a perforation 31 penetrating through the inner and outer sides thereof. The inner side of a second board 40 is formed with an accommodation hole 41. A coupling end surface of the second board 40 is formed with an insertion hole 42. The insertion hole 42 is in communication with the accommodation hole 41. After the first board 30 and the second board 40 are assembled, the perforation 31 and the insertion hole 42 are axially aligned with each other. After that, the buckle member 20 is placed in the accommodation hole 41, and then the rod member 10 is inserted into the insertion hole 42 through the perforation 31. The rod member 10 is buckled and connected to the buckle member 20 so that the first board 30 and the second board 40 are connected and fixed.

The feature of the present invention is in that: by using the engaging hole to engage with the annular engaging groove, the connection of the boards is more firm because the present invention adopts a circumferential joint. Besides, the buckle member is provided with the cross-shaped groove, which makes it easier for the user to adjust the direction when in use. The structure design is reasonable and more convenient for use.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A connecting assembly for connecting boards, comprising a rod member and a buckle member; the rod member including a head portion, a rod body and a tip portion which are integrally formed and connected in sequence, the head portion having an outer diameter greater than that of the rod body, the rod body being formed with an annular engaging groove, the annular engaging groove being disposed close to the tip portion; the buckle member being formed with an engaging hole penetrating through a circumferential side of the buckle member, the buckle being configured such that a diameter of the engaging hole is resiliently enlarged by insertion of the tip portion to allow the tip portion to pass through the engaging hole and thereafter to resiliently return to a diameter that is less than that of the tip portion so as to become engaged with the annular engaging groove of the rod member; wherein the tip portion of the rod body has a cross-shaped structure.

2. The connecting assembly as claimed in claim 1, wherein two ends of the annular engaging groove are formed with curved surfaces respectively, two ends of the engaging hole are formed with curved stepped surfaces respectively, and the curved stepped surfaces are mated with the corresponding curved surfaces.

3. The connecting assembly as claimed in claim 1, wherein an outer end surface of the buckle member has a cross-shaped groove which is provided with an indicating arrow.

* * * * *